(12) United States Patent
Oyama

(10) Patent No.: US 12,148,302 B2
(45) Date of Patent: Nov. 19, 2024

(54) TRAFFIC CONTROL SYSTEM

(71) Applicant: SUBARU CORPORATION, Tokyo (JP)

(72) Inventor: Hajime Oyama, Tokyo (JP)

(73) Assignee: SUBARU CORPORATION, Tokyo (JP)

(*) Notice: Subject to any disclaimer, the term of this patent is extended or adjusted under 35 U.S.C. 154(b) by 201 days.

(21) Appl. No.: 16/733,021

(22) Filed: Jan. 2, 2020

(65) Prior Publication Data
US 2020/0302793 A1 Sep. 24, 2020

(30) Foreign Application Priority Data

Mar. 19, 2019 (JP) .................................. 2019-051703

(51) Int. Cl.
*G08G 1/16* (2006.01)
*G08G 1/01* (2006.01)
(Continued)

(52) U.S. Cl.
CPC .............. *G08G 1/164* (2013.01); *G08G 1/01* (2013.01); *G08G 1/166* (2013.01); *G08G 1/167* (2013.01); *H04W 4/44* (2018.02); *H04L 67/10* (2013.01)

(58) Field of Classification Search
CPC .......... G08G 1/164; G08G 1/01; G08G 1/166; G08G 1/167; H04W 4/44; H04L 67/10
See application file for complete search history.

(56) References Cited

U.S. PATENT DOCUMENTS

2011/0202271 A1* 8/2011 Kruithof ............ G01C 21/3844
701/533
2016/0379484 A1* 12/2016 Kashiwai ............. G08G 1/0129
340/933
(Continued)

FOREIGN PATENT DOCUMENTS

JP 2005-099930 A 4/2005
JP 2015-138316 A 7/2015
(Continued)

OTHER PUBLICATIONS

Japanese Notice of Reasons for Refusal issued in corresponding Japanese Patent Application No. 2019-051703, dated Jan. 10, 2023, with English translation.
(Continued)

*Primary Examiner* — Adam D Tissot
*Assistant Examiner* — Charles Pall
(74) *Attorney, Agent, or Firm* — Rimon P.C.

(57) ABSTRACT

A traffic control system includes a vehicle control system and a management and control system. The vehicle control system transmits, from a probe information transmitter, traveling information of a specific section in which an own vehicle has traveled deviating from a target route or target speed of the own vehicle, as probe information. The management and control system collects the probe information of a plurality of vehicles and extracts highly reliable information by a probe information collector, and calculates and transmits recommended traveling information for passing through the specific section by a recommended traveling information calculator. The vehicle control system performs traveling control for passing through the specific section based on the recommended traveling information for the specific section received from the management and control system and recognition information of a traveling environ-
(Continued)

ment for the specific section in a specific section traveling controller.

11 Claims, 6 Drawing Sheets

(51) Int. Cl.
*H04W 4/44* (2018.01)
*H04L 67/10* (2022.01)

(56) References Cited

U.S. PATENT DOCUMENTS

| | | |
|---|---|---|
| 2018/0151066 A1 | 5/2018 | Oba |
| 2019/0289610 A1* | 9/2019 | Ju .......................... H04L 67/12 |
| 2020/0133308 A1* | 4/2020 | Raichelgauz ........ G06V 20/597 |
| 2020/0174470 A1* | 6/2020 | Park ................. B60W 60/0053 |
| 2020/0262424 A1* | 8/2020 | Kong ..................... G01C 21/20 |
| 2020/0286372 A1* | 9/2020 | Fowe ..................... G08G 1/052 |
| 2021/0309231 A1* | 10/2021 | Fujita ..................... G01C 21/30 |

FOREIGN PATENT DOCUMENTS

| | | | |
|---|---|---|---|
| JP | 2017-041070 A | | 2/2017 |
| JP | 2018-081536 A | | 5/2018 |
| JP | 2018086946 A | * | 6/2018 |
| JP | 2019020129 A | * | 2/2019 |
| WO | WO-2021132510 A1 | * | 7/2021 |

OTHER PUBLICATIONS

Japanese Notice of Reasons for Refusal issued in corresponding Japanese Patent Application No. 2019-051703, dated Jul. 4, 2023, with English translation.

* cited by examiner

TRAFFIC CONTROL SYSTEM

CROSS-REFERENCE TO RELATED APPLICATIONS

The present application claims priority from Japanese Patent Application No. 2019-51703 filed on Mar. 19, 2019, the entire contents of which are hereby incorporated by reference.

BACKGROUND

The technology relates to a traffic control system for collecting traveling information of a plurality of vehicles.

Development of a road traffic information providing system for providing information on road traffic conditions to traveling vehicles such as automobiles traveling on roads, particularly a road traffic system called Intelligent Transport Systems (ITS) has been recently promoted for automobiles.

For example, Vehicle Information and Communication System (VICS: registered trademark in Japan) is known as a road traffic information providing system. VICS is normally a system that mainly provides macro information for a section of a road, and a vehicle can grasp a forward traveling environment by receiving information on obstacles such as falling objects on the road from the VICS.

Furthermore, a technique for recognizing a forward traveling environment by a camera, laser radar or the like, and performing traveling control based on the recognized traveling environment has been also adopted on a vehicle side. Therefore, safer traveling of a vehicle is enabled by using, in combination, information received from an infrastructure side such as VICS and traveling environment information autonomously recognized by a vehicle.

For example, Japanese Unexamined Patent Application Publication (JP-A) No. 2017-41070 discloses a technique of searching a traveling route by using chronological traveling environment information obtained by communication and traveling environment information acquired by a camera or the like, and performing traveling control of a vehicle on the searched traveling route.

SUMMARY

An aspect of the technology provides a traffic control system. The system includes a vehicle control system configured to transmit traveling information during traveling of an own vehicle, and a management and control system configured to collect the traveling information from vehicle control systems of a plurality of vehicles and transmit recommended traveling information based on the collected traveling information. The vehicle control system includes: a probe information transmitter configured to transmit, as probe information, traveling information of a specific section in which the own vehicle has traveled deviating from a target route or target speed of the own vehicle by a predetermined amount based on a recognition result of a traveling environment of the own vehicle; and a specific section traveling controller configured to perform traveling control for passing through the specific section, based on the recommended traveling information for the specific section received from the management and control system and recognition information of the traveling environment for the specific section. The management and control system includes: a probe information collector configured to collect the probe information of a plurality of vehicles and extract highly reliable information; and a recommended traveling information calculator configured to calculate the recommended traveling information for passing through the specific section, based on the probe information extracted by the probe information collector, and transmit the calculated recommended traveling information.

An aspect of the technology provides a traffic control system. The system includes a vehicle control system including first circuitry configured to transmit traveling information during traveling of an own vehicle, and a management and control system including second circuitry configured to collect the traveling information from vehicle control systems of a plurality of vehicles, and transmit recommended traveling information based on the collected traveling information. The first circuitry is configured to transmit, as probe information, traveling information of a specific section in which the own vehicle has traveled deviating from a target route or target speed of the own vehicle by a predetermined amount based on a recognition result of a traveling environment of the own vehicle. The first circuitry is configured to perform traveling control for passing through the specific section, based on the recommended traveling information for the specific section received from the management and control system, and recognition information of the traveling environment for the specific section. The second circuitry is configured to collect the probe information of a plurality of vehicles and extract highly reliable information. The second circuitry is configured to calculate the recommended traveling information for passing through the specific section, based on the extracted probe information and transmit the calculated recommended traveling information.

BRIEF DESCRIPTION OF THE DRAWINGS

The accompanying drawings are included to provide a further understanding of the disclosure and are incorporated in and constitute a part of this specification. The drawings illustrate example embodiments and, together with the specification, serve to explain the principles of the disclosure.

DETAILED DESCRIPTION

In the following, some embodiments of the technology are described in detail with reference to the accompanying drawings. Note that the following description is directed to illustrative examples of the technology and not to be construed as limiting to the technology. Factors including, without limitation, numerical values, shapes, materials, components, positions of the components, and how the components are coupled to each other are illustrative only and not to be construed as limiting to the technology. Further, elements in the following example embodiments which are not recited in a most-generic independent claim of the technology are optional and may be provided on an as-needed basis. The drawings are schematic and are not intended to be drawn to scale. Throughout the present specification and the drawings, elements having substantially the same function and configuration are denoted with the same numerals to avoid any redundant description. A vehicle cannot avoid falling objects just before the falling objects are reflected in information on the infrastructure side such as VICS, and ruts on roads, puddles, cracks of road surfaces, etc., that are not reflected in information on the infrastructure side until the vehicle comes just before the falling objects, or the like. For this reason, simply and univocally combining the information on the infrastructure side and the information on the vehicle side as disclosed in JP-A No. 2017-41070 is not necessarily enough to enable safety and stable traveling of a vehicle to be performed and realize a smooth traffic flow.

Accordingly, it is desirable to provide a traffic control system that enables safety and stable traveling of a vehicle and can realize a smooth traffic flow.

Figure 1:
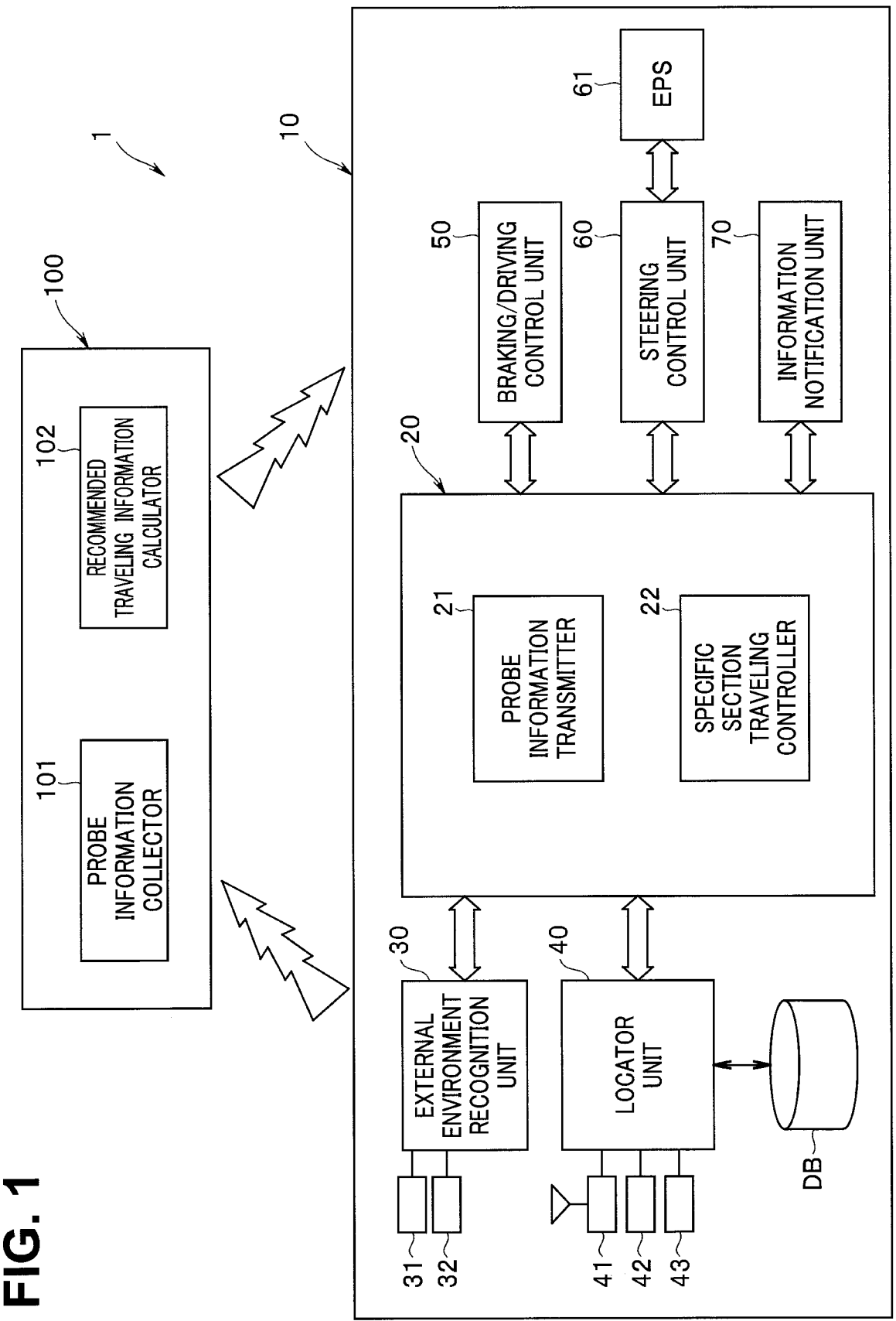
FIG. 1 is an overall configuration diagram of a traffic control system.

An embodiment of the technology will be described below with reference to the drawings. FIG. 1 is an overall configuration diagram of a traffic control system. As illustrated in FIG. 1, the traffic control system 1 according to the embodiment is configured by a vehicle control system 10 of each vehicle configured to transmit traveling information of the vehicle during traveling under automatic driving to a network based on cloud computing (hereinafter simply referred to as a "cloud"), and a cloud-linkage management and control system 100 configured to collect and process traveling information of a plurality of vehicles.

In the embodiment, the vehicle control system 10 includes, as a main component, an automatic driving control unit 20 for controlling traveling under automatic driving that does not require any driving operation of a vehicle occupant. An external environment recognition unit 30, a locator unit 40, a braking/driving control unit 50, a steering control unit 60, an information notification unit 70, and the like are mutually and communicatively coupled to the automatic driving control unit 20 through an in-vehicle network.

The external environment recognition unit 30 includes various devices for environment recognition such as a camera unit 31 and a radar device 32 such as a millimeter wave radar or a laser radar. The external environment recognition unit 30 recognizes an external environment around an own vehicle based on detection information of objects around the own vehicle detected by the camera unit 31 or the radar device 32, traffic information acquired by infrastructure communication such as road-to-vehicle communication and vehicle-to-vehicle communication, position information of the own vehicle measured by a locator unit 40 and the like.

For example, when a stereo camera configured by two cameras for capturing images of the same object from different viewpoints is mounted as the camera unit 31 in the own vehicle, the external environment recognition unit 30 performs stereo processing on a pair of right and left images captured by the stereo camera to recognize an external environment three-dimensionally. The camera unit 31 as the stereo camera is configured, for example, by arranging two shutter-synchronized color cameras each having an imaging element such as CCD or CMOS on right and left sides in a vehicle width direction with a predetermined baseline length in the vicinity of a room mirror located at an upper part of the vehicle interior inside the windshield.

The pair of right and left images captured by the camera unit 31 as the stereo camera is subjected to matching processing to determine a pixel shift amount (parallax) at corresponding positions on the right and left images, and the pixel shift amount is converted into luminance data or the like to generate a distance image. Points on the distance image are coordinate-transformed to points in a real space with the own vehicle centered therein according to the principle of triangulation, and right and left lane lines defining a traveling lane of a road on which the own vehicle travels, obstacles, vehicles traveling ahead of the own vehicle, etc., are three-dimensionally recognized.

The right and left lane lines of the road can be recognized by extracting a point group as candidates for each of the lane lines from an image and calculating a straight line or a curved line connecting the candidate points. For example, within a lane line detection region set on the image, edges which change in luminance by a predetermined value or more on a plurality of search lines set in a horizontal direction (vehicle width direction) are detected, and a pair of a lane line start point and a lane line end point are detected for each search line, whereby an intermediate region between the lane line start point and the lane line end point is extracted as lane line candidate points.

Time-series data of spatial coordinate positions of lane line candidate points based on a vehicle movement amount per unit time are processed to calculate a model approximating the right and left lane lines, thereby recognizing the lane lines. As a lane line approximating model, an approximate model obtained by connecting linear components obtained by the Hough transform, or a model approximated by a curve such as a quadratic equation can be used.

The locator unit 40 mainly performs positioning based on signals from a plurality of navigation satellites such as Global Navigation Satellite System (GNSS) satellites, and detects the vehicle position of the own vehicle. When the positioning accuracy deteriorates due to a capturing state of signals (radio waves) from satellites, the influence of multipath caused by reflection of radio waves, or the like, the locator unit 40 detects the vehicle position of the own vehicle by performing the positioning based on autonomous navigation using in-vehicle sensors such as a gyro sensor 42 and a vehicle speed sensor 43 in combination.

According to the positioning based on the plurality of navigation satellites, signals including information on the orbit, time, etc., transmitted from the navigation satellites are received via a receiver 41, and the own position of the own vehicle is measured as an absolute position including longitude, latitude, altitude, and time information based on the received signals. Furthermore, according to the positioning based on the autonomous navigation, the position of the own vehicle as a relative positional change is measured based on the traveling azimuth of the own vehicle detected by the gyro sensor 42 and the moving distance of the own vehicle calculated from a vehicle speed pulse output from the vehicle speed sensor 43 or the like.

The locator unit 40 includes a map database DB, and specifies the position on map data of the map database DB from position data of the positioned own vehicle. The map database DB is a database that holds a high-precision map created for control of traveling including automatic driving, and is stored in a large-capacity storage medium such as a hard disk drive (HDD) or a solid state drive (SSD).

For example,, the high-precision map is configured as a multi-dimensional map (dynamic map) that holds, in multiple hierarchies, static information such as road shapes and connection relationships among roads and dynamic information such as traffic information collected by infrastructure communication. Road data include types of road lane lines, the number of traveling lanes, a width of each of the traveling lanes, point sequence data indicating the center position in a width direction of each of the traveling lanes, curvature of each of the traveling lanes, a traveling azimuth angle of each of the traveling lanes, a speed limit, etc., and are stored together with attribute data such as data reliability and data update date.

Further, the locator unit 40 performs maintenance management of the map database DB, verifies nodes, links, and data points of the map database DB to keep them in an up-to-date state at all time, and creates and adds new data for areas for which no data exists on the database, thereby configuring a more detailed database. Update of data and addition of new data in the map database DB are performed by collating the measured position data with the data stored in the map database DB.

The braking/driving control unit 50 controls a traveling driving force to be generated by an electric motor or an internal combustion engine, and controls a traveling speed of the own vehicle, switching between forward movement and reverse movement, braking, and the like. For example, the braking/driving control unit 50 controls an operation state of the engine based on signals from various sensors for detecting the operation state of the engine and various control information acquired via the in-vehicle network, and also controls braking devices (not illustrated) for four wheels based on a brake switch, wheel speeds of the four wheels, a steering angle, a yaw rate, and other vehicle information, independently of a braking operation of an occupant (driver). Further, the braking/driving control unit 50 calculates brake fluid pressure of each wheel based on the brake force of each wheel to perform control of an anti-lock braking system, side slip prevention and the like.

The steering control unit 60 controls a steering torque by the electric power steering (EPS) unit 61 provided in a steering system, based, for example, on a vehicle speed, a driver's steering torque, a steering angle, a yaw rate, and other vehicle information. The control of the steering torque is performed as current control for the electric motor of the EPS unit 61 that realizes a target steering torque for making an actual steering angle coincide with the target steering angle. The EPS unit 61 uses the target steering torque from the steering control unit 60 as an instruction torque, and controls the drive current of the electric motor corresponding to the instruction torque, for example, by PID control.

The information notification unit 70 controls the outputs of an alarm when abnormality occurs in various devices of the vehicle or an alarm for calling driver's attention, and various information to be presented to the driver. For example, a warning or control information is notified by using at least one of a visual output such as a monitor, a display or an alarm lamp, or an auditory output such as a speaker or a buzzer. During the execution of the traveling control including automatic driving, the information notification unit 70 presents a control state of the traveling control to the driver, and when the traveling control including the automatic driving is suspended by a driver's operation, the driving state at that time is notified to the driver.

Next, the automatic driving control unit 20 serving as a main component of the vehicle control system 10 will be described. When the driver selects a driving support mode in which the driver operates a switch or a panel (not illustrated) to support a driver's driving operation or an automatic driving mode which does not require the driver's driving operation in place of a manual driving mode in which the driver performs all driving operations such as steering, acceleration/deceleration and braking to drive the own vehicle, the automatic driving control unit 20 performs traveling control via the braking/driving control unit 50 and the steering control unit 60 based on information from the external environment recognition unit 30 and the locator unit 40.

Note that in the present embodiment, the driving support mode means a driving mode that requires the driver to hold a steering wheel or steer, and automatically performs at least one of acceleration/deceleration control or steering control, and is assumed to include partial automatic driving. On the other hand, the automatic driving mode means a driving mode presupposing hands-off driving in which the driver does not touch the steering wheel, and is a conditional automatic driving mode in which all of the acceleration/deceleration control and the steering control are automatically performed in an operation region in design where the automatic operation function operates normally.

The automatic driving mode is canceled when the driver performs an override operation such as holding the steering wheel or steering with a steering torque equal to or more than a set value, stepping on a brake pedal or stepping on an accelerator pedal. Furthermore, in the automatic driving mode, when it is difficult to continue the operation by the system, the automatic driving is canceled and the driving is entrusted to manual driving by the driver.

When an occupant (driver) turns on the automatic driving mode, inputs information on a destination and waypoints (facility names, addresses, telephone numbers, etc.) or directly specifies the information on a map displayed on a panel or the like, the automatic driving control unit 20 sets position coordinates (latitude, longitude) of a traveling route via the locator unit 40, or on a motorway or the like, a road and a traveling lane on which the vehicle travels are specified without specifying a destination and a traveling route, by turning on the automatic driving mode during traveling on a main lane.

The automatic driving control unit 20 calculates the center position in the width direction of the specified traveling lane of the specified road by using map data and an in-vehicle sensor such as the camera unit 31, and sets a trajectory in the traveling direction of the center position of the traveling lane as a target route under automatic driving. The same applies when neither a destination nor a traveling lane is specified, and a trajectory in the traveling direction of the center position of the traveling lane is set as a target route under automatic driving.

The automatic driving control unit 20 sets a vehicle speed set by the driver or a road speed limit as a target vehicle speed under automatic driving, and causes the own vehicle to automatically travel to a destination along the target route while appropriately adjusting the target vehicle speed according to a curvature of the target route, the type and gradient of the road, the distances from other vehicles, etc. When neither a destination nor a traveling route is specified, the own vehicle is caused to travel so as to follow the center position of the traveling lane.

Based on the information from the external environment recognition unit 30, the locator unit 40, and the in-vehicle sensor, the automatic driving control unit 20 detects traveling information such as the position in a lateral direction (lateral position) of the own vehicle with respect to the target route (the center position of the lane), a yaw angle with respect to the target route in the traveling direction of the own vehicle, and the vehicle speed. The automatic driving control unit 20 performs steering control following the target route via the steering control unit 60 and the EPS unit 61, and performs the acceleration/deceleration control to the target speed via the braking/driving control unit 50.

During the traveling control to the automatic driving, the automatic driving control unit 20 transmits the traveling information of the own vehicle to the cloud, and receives recommended traveling information from the management and control system 100 via the cloud. As function units associated with the cloud-linkage traveling information, the automatic driving control unit 20 includes a probe information transmitter 21 and a specific section traveling controller 22, and the management and control system 100 includes a probe information collector 101, and a recommended traveling information calculator 102.

Normally, the automatic driving control unit 20 performs traveling control so that deviation amounts of the lateral position and yaw angle of the own vehicle from the target route converge within preset control ranges, and a deviation amount of the speed of the own vehicle from the target speed converges within a preset control range. However, depending on some traveling environment, there is a case where it is desirable for the own vehicle to travel on a route different from the target route or to travel at a speed different from the target speed. For example, when the external environment recognition unit 30 recognizes such a situation in which an obstacle, a rut, a frozen place or the like exists on a road of a target route, the automatic driving control unit 20 controls the own vehicle to have a trajectory (behavior trajectory) based on a vehicle behavior of a route or speed different from a normal route or speed in order to avoid the obstacle, the rut, the frozen place or the like.

The probe information transmitter 21 determines, as a specific section, a section in which the own vehicle has had a behavior trajectory different from the usual one, that is, a section in which the own vehicle has traveled deviating by a predetermined amount from the target route or the target speed based on a recognition result of a traveling environment of the own vehicle. In the present embodiment, the probe information transmitter 21 sets, as a specific section, a section in which the own vehicle deviates from the target route so that the deviation amount of the lateral position of the own vehicle exceeds a normal control range, or a section in which the own vehicle deviates from the target speed so that the deviation amount of the vehicle speed exceeds a normal control range, and transmits traveling information of the specific section as the probe information to the cloud CL as illustrated in FIG. 2, for example.

Figure 2:
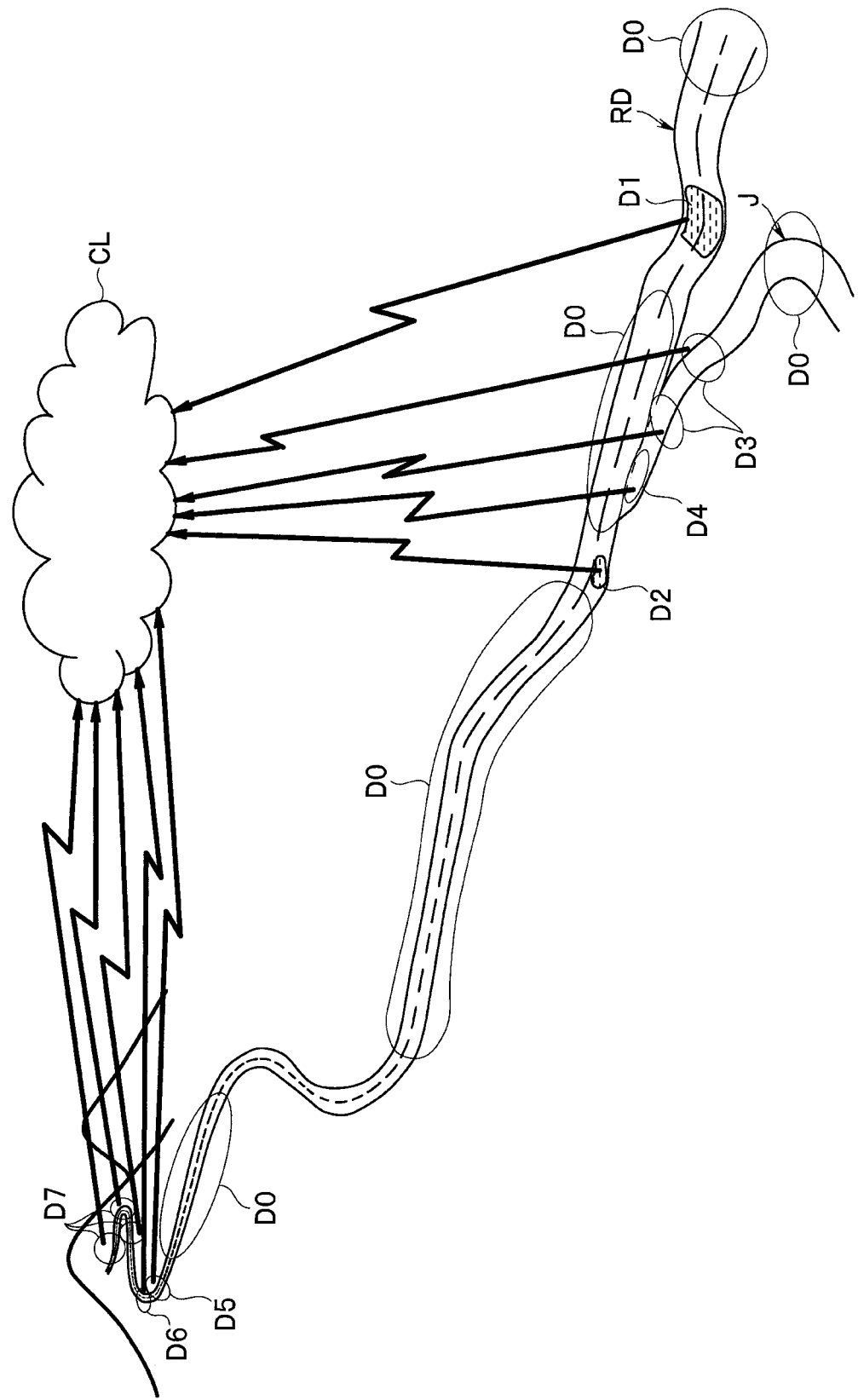
FIG. 2 is an explanatory diagram illustrating transmission of probe information in a specific section.

FIG. 2 is an explanatory diagram illustrating transmission of the probe information. In FIG. 2, a section D1 having a deep puddle existing on a road RD, a section D2 having a shallow puddle existing on the road RD, an acceleration section D3 on a merging lane J, a merging section D4, an entrance section D5 including a curve of a large curvature, a central section D6 of the curve, a section D7 covered with snow at a high altitude place, etc., are set as specific sections in which a vehicle travels deviating from the target route or the target speed by a predetermined amount, and only traveling information of these specific sections are transmitted as the probe information to the cloud CL. Traveling information of a normal traveling section D0 is not transmitted.

In the present embodiment, the probe information transmitter 21 transmits, as the probe information, at least one of the lateral position of the own vehicle in the specific section or a passing speed in the specific section together with information on the position of the specific section and a passing time at which the vehicle passed the specific section. In other words, if all information during traveling is transmitted, an amount of data becomes enormous. Therefore, as illustrated in FIG. 3, the probe information is uploaded onto the cloud CL only when the vehicle has a behavior trajectory different from the normal one.

Figure 3:
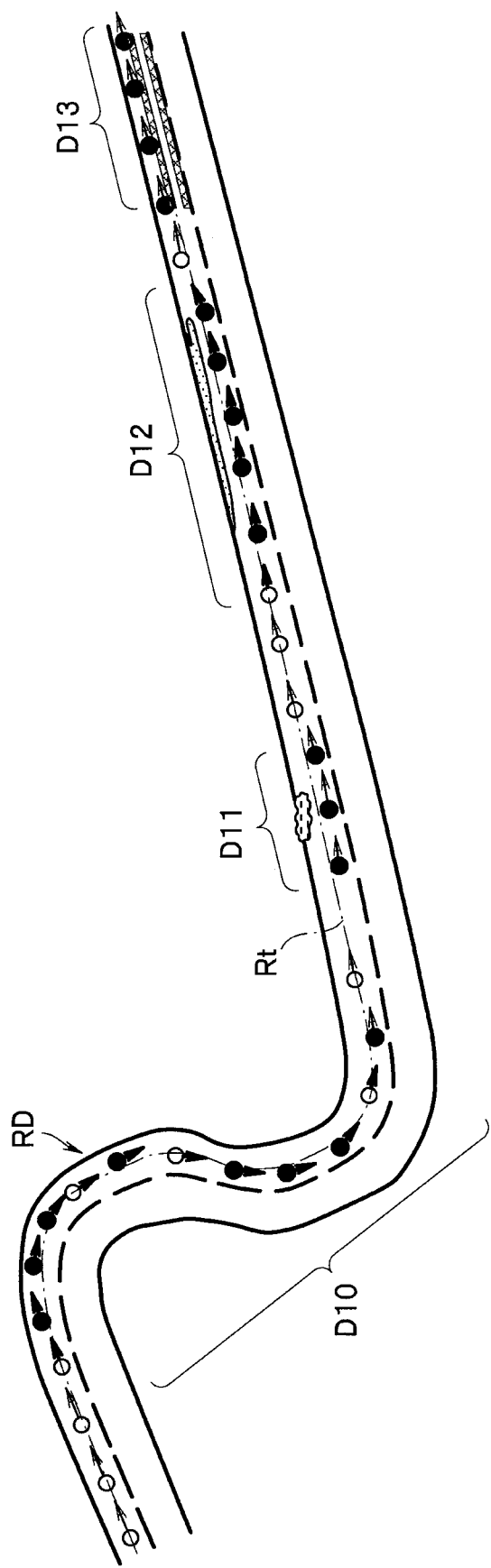
FIG. 3 is an explanatory diagram illustrating transmission of the probe information according to a traveling state.

FIG. 3 is an explanatory diagram illustrating transmission of the probe information corresponding to a traveling state. In FIG. 3, circles indicate a vehicle position, and arrows indicate a passing speed. Among the circles indicating the vehicle position, open circles mean that no data are transmitted because the vehicle is traveling near a target route (the center of a lane) Rt. On the other hand, filled circles mean that data are transmitted because the vehicle deviates greatly from the target route (the center of the lane) Rt. Further, among the arrows indicating the passing speed, thin arrows mean that no data are transmitted because the passing speed is almost within a target speed. On the other hand, thick arrows mean that data are transmitted because the passing speed deviates greatly from (falls below) the target speed.

In FIG. 3, the vehicle passes through a curve section D10 of the road RD along "out-in-out" route with respect to the target route Rt. In a section D11 having a puddle on a roadside and a section D12 having a snowdrift on the road side, the vehicle travels near the center of the road RD while avoiding the puddle and the snowdrift. Moreover, in a section D13 having a rut, the vehicle travels near the outer part of the road while avoiding the rut. These sections D10, D11, D12, and D13 are specific sections in which the vehicle has traveled deviating from the target route or the target speed by a predetermined amount, and probe information is transmitted in these specific sections.

The probe information of each of the specific sections which has been uploaded onto the cloud CL is collected by the probe information collector 101 of the management and control system 100, and recommended traveling information for passing through each of the specific sections is calculated by the recommended traveling information calculator 102.

The probe information collector 101 extracts highly reliable information from the collected probe information of a plurality of vehicles and transmits the extracted information to the recommended traveling information calculator 102. The highly reliable information is extracted by removing old information after a lapse of a set period of time or longer, or removing information in which the lateral position of the vehicle in each of the specific sections or the passing speed in each of the specific sections deviates from an average value by a set value or more, even if the information is new.

Figure 4:
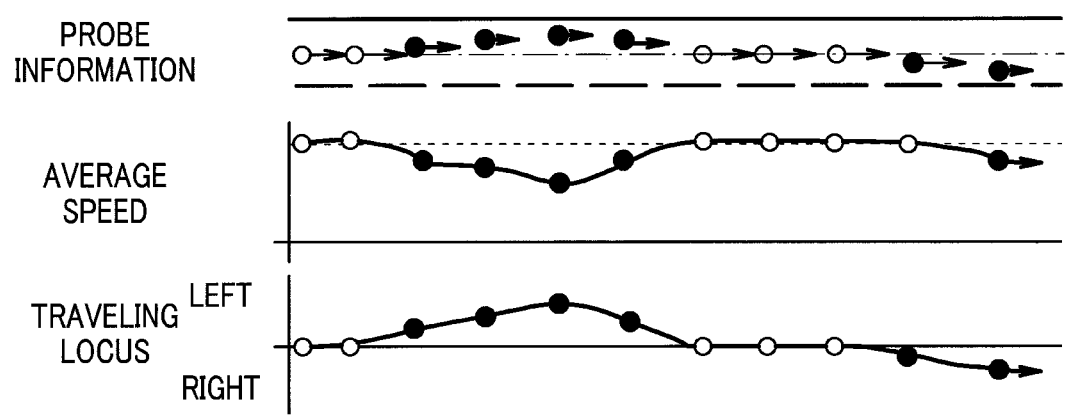
FIG. 4 is an explanatory diagram illustrating the probe information and recommended traveling information.

The recommended traveling information calculator 102 calculates recommended traveling information for passing through the specific section based on the probe information collected and extracted by the probe information collector 101. For example, as illustrated in FIG. 4, based on the probe information of a plurality of vehicles in a certain specific section, the recommended traveling information calculator 102 calculates an average traveling trajectory in the specific section, and also calculates an average speed of the plurality of vehicles in the specific section. FIG. 4 is an explanatory diagram illustrating the probe information and the recommended traveling information. The recommended traveling information calculator 102 transmits the recommended traveling information including the average traveling trajectory and the average speed in the specific section to the cloud, with position information of the specific section being contained in the recommended traveling information.

The recommended traveling information transmitted from the recommended traveling information calculator 102 is received by the vehicle control system 10 via the cloud. The vehicle control system 10 performs traveling control for passing through the specific section based on the received recommended traveling information for the specific section and recognition information of the traveling environment for the specific section via the external environment recognition unit 30 in the specific section traveling controller 22 of the automatic driving control unit 20.

For example,, the specific section traveling controller 22 recognizes, by a camera unit 31 of the external environment recognition unit 30 or the like, the traveling environment when passing through the specific section along an average traveling trajectory or at an average passing speed of a large number of vehicles which is grasped from the recommended traveling information, and determines whether there is hindrance caused by the presence or absence of an obstacle on a road, the presence or absence of an approaching oncoming vehicle, the presence or absence of a following overtaking vehicle, or the like.

When determining that there is no hindrance to passing through the specific section based on the recommended traveling information, the specific section traveling controller 22 performs the traveling control based on the recommended traveling information and causes the vehicle to pass through the specific section. On the other hand, when determining that there is hindrance to the traveling based on the recommended traveling information, the specific section traveling controller 22 cancels the recommended traveling information, performs traveling control based on the traveling environment of the specific section recognized by the in-vehicle camera unit 31 or the like, and causes the vehicle to pass through the specific section.

Figure 5:
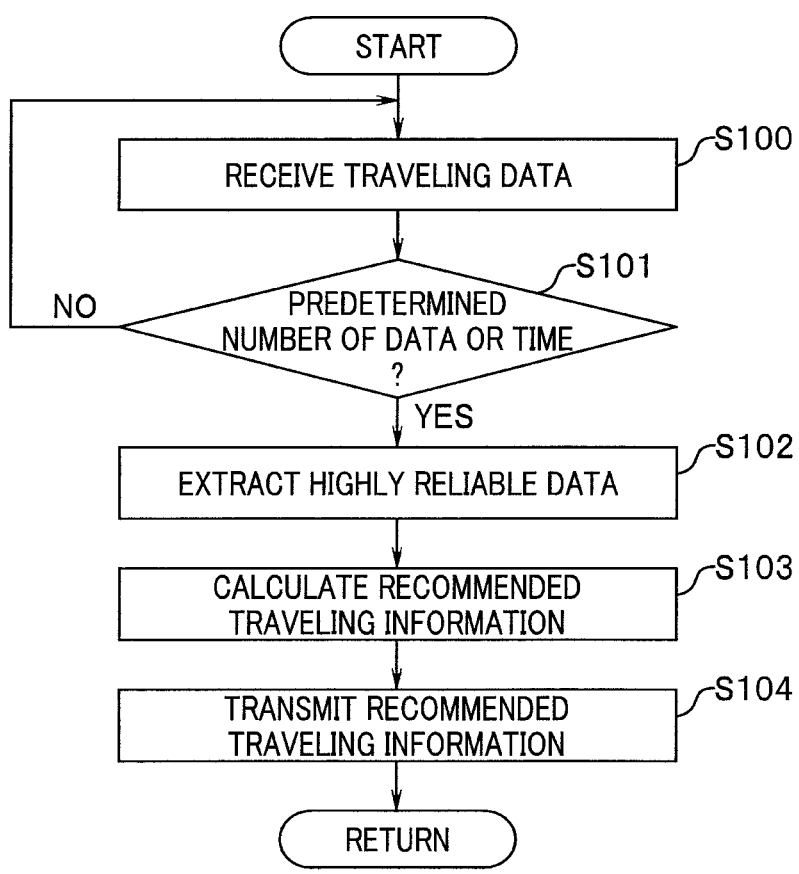
FIG. 5 is a flowchart illustrating processing on a management and control system side.
Figure 6:
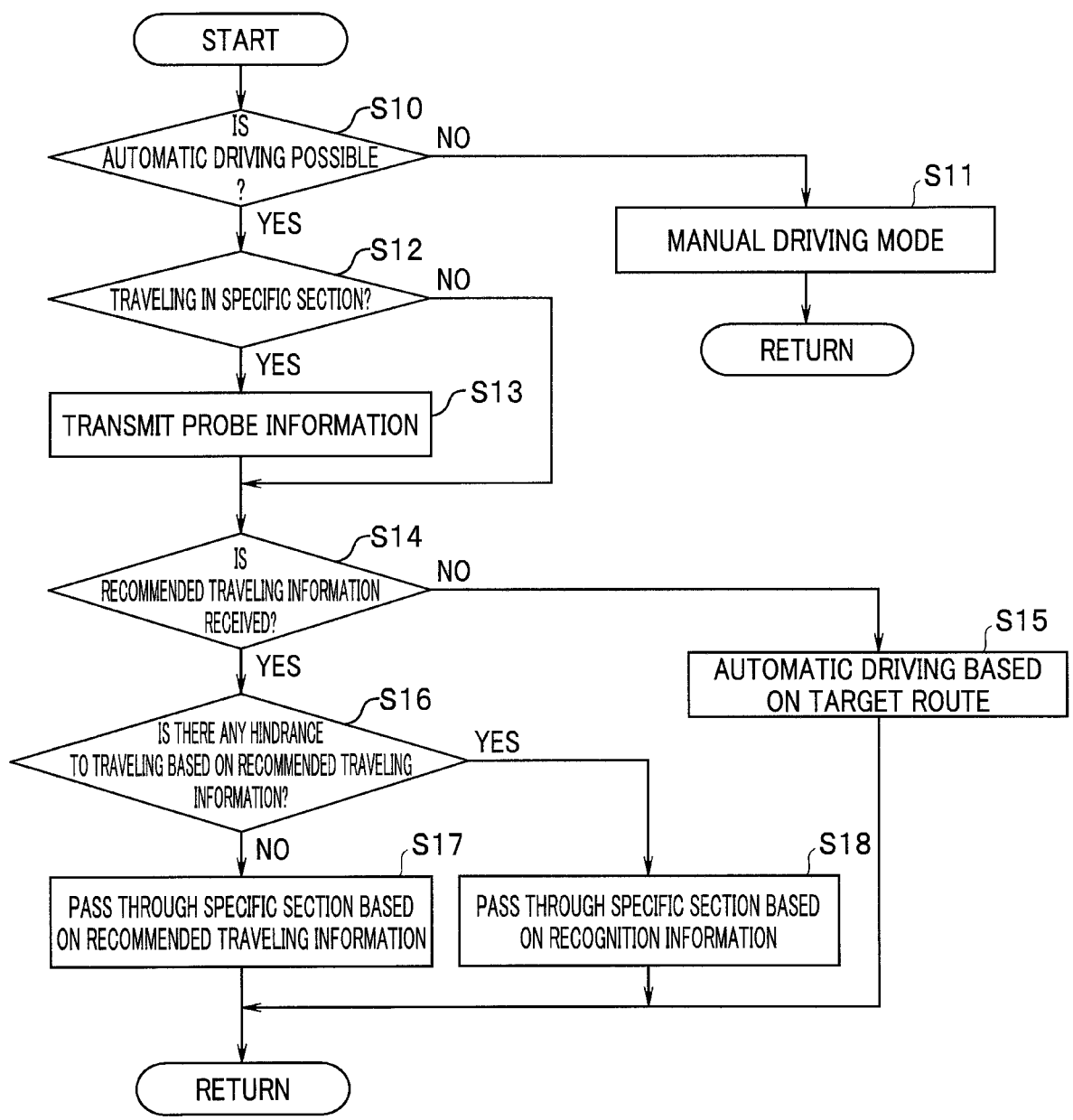
FIG. 6 is a flowchart illustrating processing on a vehicle control system side.

Next, an operation of the traffic control system 1 will be described with reference to flowcharts in FIGS. 5 and 6. FIG. 5 is a flowchart illustrating the processing on the management and control system side, and FIG. 6 is a flowchart illustrating the processing on the vehicle control system side.

First, the processing on the management and control system side in FIG. 5 will be described. As the processing of the probe information collector 101, the management and control system 100 receives traveling data of the probe information in step S100, and checks whether traveling data have been received by a predetermined number or for a predetermined period of time in step S101. When the traveling data have not been collected by the predetermined number or for the predetermined period of time, data collection is continued by data reception in step S100. When the number of collected traveling data has reached the predetermined number or the traveling data has been collected for the predetermined period of time, the processing proceeds to step S102.

In step S102, the management and control system 100 removes, from the collected traveling data, old information after the lapse of the set period of time or longer or data deviating from average data, thereby extracting highly reliable data. Subsequent step S103 is processing in the recommended traveling information calculator 102 of the management and control system 100, and calculates the recommended traveling information (recommended traveling route, recommended passing speed) for passing through the specific section based on the highly reliable data extracted from the probe information of the specific section.

Thereafter, the processing proceeds to step S104, and the recommended traveling information calculator 102 transmits the recommended traveling information calculated in step S103, with the position information of the specific section being included in the recommended traveling information. In this case, when a vehicle traveling to the specific section can be detected from incidental facilities of roads, etc., the recommended traveling information is transmitted to vehicles located within a set range in front of the specific section. When the present position of each vehicle cannot be detected on the management and control system 100 side, whether the recommended traveling information is adopted is determined on the vehicle side based on the position information of the specific section included in the recommended traveling information received from the cloud.

Next, the processing on the vehicle control system side in FIG. 6 will be described. In first step S10, the vehicle control system 10 determines, in the automatic driving control unit 20, whether automatic driving is possible. For example, when it is difficult to continue the automatic driving because abnormality occurs in a part of the system, the vehicle gets out of the operation area of the automatic driving or the like, the automatic driving control unit 20 determines that it is impossible to continue the automatic driving, and proceeds the processing from step S10 to step S11 to request the occupant to take over the driving, and shifts the driving mode from the automatic driving mode to the manual driving mode.

On the other hand, when automatic driving is possible in step S10, the processing proceeds from step S10 to step S12, and as the processing of the probe information transmitter 21, the automatic driving control unit 20 checks whether the vehicle has traveled in the specific section in which the behavior trajectory different from the normal one has been taken. When the vehicle has performed normal traveling under which the vehicle does not travel in the specific section, the processing proceeds to the processing of step S14. When the vehicle has traveled in the specific section, traveling information of the relevant specific section is transmitted as the probe information onto the cloud in step S13, and the processing proceeds to the processing of step S14.

In step S14, the automatic driving control unit 20 checks whether the recommended traveling information has been received from the management and control system 100. When no recommended traveling information has been received, the processing proceeds from step S14 to step S15, and the automatic driving control unit 20 continues the automatic driving for traveling so as to follow the target route.

On the other hand, when recommended traveling information has been received in step S14, as the processing of the specific section traveling controller 22, the automatic driving control unit 20 proceeds from step S14 to step S16 to determine the presence or absence of an obstacle which might be hindrance to a recommended traveling route or a recommended passing speed based on the recommended traveling information.

As a result, when it is determined that there is no obstacle, in step S17, the target route and the target speed at that time are changed to a recommended traveling route and a recommended passing speed based on the recommended traveling information, and automatic driving is performed to cause the vehicle to pass through the specific section. On the other hand, when it is determined that there is an obstacle, in step S18, a new traveling route and passing speed are calculated based on the traveling environment recognized by the external environment recognition unit 30, and automatic driving is performed to cause the vehicle to pass through the specific section.

As described above, in the present embodiment, the traveling information of the specific section in which a vehicle has traveled deviated from the target route or target speed for automatic driving is transmitted as the probe information from the vehicle control system 10 of the vehicle. The probe information of each of a plurality of vehicles is collected in the management and control system 100, and the recommended traveling information for passing through the specific section is calculated from the collected probe information, and transmitted to the vehicle. When the vehicle passes through the specific section, the vehicle control system 10 performs traveling control for passing through the specific section based on the recommended traveling information for the specific section received from the management and control system 100 and the recognition information of the traveling environment for the specific section by the in-vehicle camera unit 31 or the like.

As a result, it is possible to cope with a change of the traveling environment caused by a falling object just before the change is reflected in VICS information, etc., and it is possible to safely avoid, well in advance, ruts, puddles, snowdrifts, cracks on a road surface, etc., that are not reflected in the information. Furthermore, it is possible to achieve optimal traveling according to the traveling environment, such as passage of an optimal route of a curve and an optimal traveling speed according to an actual weather, which enables each vehicle to perform safer and more stable traveling, whereby a smooth flow of traffic can be realized.

In addition, since only the information necessary for traveling in the specific section is transmitted and received between the vehicle control system 10 and the management and control system 100 via the cloud, the amount of information can be effectively reduced, and information reflecting the latest traveling environment can be quickly transmitted to each vehicle.

Each of the vehicle control system 10 and the management and control system 100 of the traffic control system 1 illustrated in FIG. 1 can be implemented by circuitry including at least one semiconductor integrated circuit such as at least one processor (e.g., a central processing unit (CPU)), at least one application specific integrated circuit (ASIC), and/or at least one field programmable gate array (FPGA). At least one processor can be configured, by reading instructions from at least one machine readable tangible medium, to perform all or a part of functions of the vehicle control system 10 or the management and control system 100. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and an SRAM, and the nonvolatile memory may include a ROM and an NVRAM. The ASIC is an integrated circuit (IC) customized to perform, and the FPGA is an integrated circuit designed to be configured after manufacturing in order to perform, all or a part of the functions of the modules illustrated in FIG. 1.

Although some embodiments of the technology have been described in the foregoing by way of example with reference to the accompanying drawings, the technology is by no means limited to the embodiments described above. It should be appreciated that modifications and alterations may be made by persons skilled in the art without departing from the scope as defined by the appended claims. The technology is intended to include such modifications and alterations in so far as they fall within the scope of the appended claims or the equivalents thereof.

The invention claimed is:

1. A traffic control system comprising:
a first vehicle control system, mounted on a first vehicle, configured to perform operations including:
  determining a center position in a width direction of a traveling lane where the first vehicle travels using at least a sensor of the first vehicle;
  performing traveling control to cause a deviation amount of the first vehicle in the width direction of the traveling lane from the center position to converge within a control range;
  obtaining surrounding information of the first vehicle using at least one of a camera device and a radar device of the first vehicle, wherein the surrounding information includes a position in a lateral direction of the first vehicle with respect to the center position of the traveling lane; and
  transmitting traveling information of the first vehicle and position information of a specific section of a road based on determining that the first vehicle travels the specific section, the specific section being each of sections where the first vehicle is controlled, based on the surrounding information, to deviate from the center position of the traveling lane when performing the traveling control so that the deviation amount exceeds the control range of the traveling control, the traveling information including information on the position in the lateral direction of the first vehicle in the specific section, information on a position of the specific section, and a passing time at which the vehicle passed the specific section, the traveling information not being transmitted when the first vehicle travels a traveling section other than the specific section;
a management and control system configured to perform operations including:
  collecting the traveling information from the first vehicle control system and traveling information from a second vehicle control system configured to perform operations that are same as the operations to be performed by the first vehicle control system;
  extracting information from the collected traveling information including the traveling information from the first vehicle control system and the traveling information from the second vehicle control system, by removing, in a case where a value corresponding to the position in the lateral direction of the first vehicle deviates from a predetermined value by a set value or more, the traveling information from the first vehicle control system from the collected traveling information;
  based on the extracted information, generating recommended traveling information for the specific section, the recommended traveling information including a recommended route for vehicles to pass the specific section; and
  transmitting the recommended traveling information, based on the position information of the specific section, to a third vehicle that is detected as a vehicle traveling the road toward the specific section; and
a third vehicle control system, mounted on the third vehicle, configured to perform operations that are same as the operations to be performed by the first and second vehicle control systems, and configured to perform operations including:
  based on receiving the recommended traveling information from the management and control system, changing a target route of the third vehicle to the recommended route, and controlling the third vehicle to travel the specific section of the road along the recommended route; and when not receiving the recommended traveling information from the management and control system, controlling the third vehicle to continue performing the traveling control to follow the target route of the third vehicle, wherein the third vehicle control system is further configured to:

determine, based on receiving the recommended traveling information from the management and control system, whether an obstacle in the specific section prevents the third vehicle from maintaining the recommended route based on surrounding information of the third vehicle;

control the third vehicle to travel the specific section of the road along the recommended route further based on determining that no obstacle prevents the third vehicle from maintaining the recommended route; and control the third vehicle to travel the specific section of the road along a new traveling route calculated based on surrounding information using at least one of the camera device and the radar device of the third vehicle when determining that the obstacle prevents the third vehicle from maintaining the recommended route.

2. The traffic control system according to claim 1, wherein the management and control system is configured to extract the information by removing, from the collected traveling information, information after a lapse of a set period of time or longer.

3. The traffic control system according to claim 1, wherein the management and control system is configured to extract the extracted information by removing, from the collected traveling information, information after a lapse of a set period of time or longer.

4. The traffic control system according to claim 1, wherein the first to third vehicle control systems are configured to communicate with the management and control system through a cloud.

5. A traffic control system comprising:

a first vehicle control system, mounted on a first vehicle, comprising first circuitry configured to perform operations including:

determining a center position in a width direction of a traveling lane where the first vehicle travels using at least a sensor of the first vehicle;

performing traveling control configured to cause a deviation amount of the first vehicle in the width direction of the traveling lane from the center position to converge within a control range;

obtaining surrounding information of the first vehicle using at least one of a camera device and a radar device of the first vehicle, the surrounding information includes a position in a lateral direction of the first vehicle with respect to the center position of the traveling lane; and transmitting traveling information of the first vehicle and position information of a specific section of a road based on determining that the first vehicle travels the specific section, the specific section being each of sections where the first vehicle is controlled, based on the surrounding information, to deviate from the center position of the traveling lane when performing the traveling control so that the deviation amount exceeds the control range of the traveling control, the traveling information including information on the position in the lateral direction of the first vehicle in the specific section, information on a position of the specific section, and a passing time at which the vehicle passed the specific section, the traveling information not being transmitted when the first vehicle travels a traveling section other than the specific section; and a management and control system comprising second circuitry configured to perform operations including:

collecting the traveling information from the first vehicle control system and traveling information from a second vehicle control system comprising third circuitry configured to perform operations that are same as the operations to be performed by the first circuitry of the first vehicle control system;

extracting information from collected traveling information including the traveling information from the first vehicle control system and the traveling information from the second vehicle control system, by removing, in a case where a value corresponding to the position in the lateral direction of the first vehicle deviates from a predetermined value by a set value or more, the traveling information from the first vehicle control system from the collected traveling information;

based on the extracted information, generating recommended traveling information for the specific section, the recommended traveling information including a recommended route for vehicles to pass the specific section; and transmitting the recommended traveling information, based on the position information of the specific section, to a third vehicle that is detected as a vehicle traveling the road toward the specific section; and a third vehicle control system, mounted on the third vehicle, comprising fourth circuitry configured to perform operations that are same as the operations to be performed by the first and second circuitry of the first and second vehicle control systems, and configured to perform operations including:

based on receiving the recommended traveling information from the management and control system, changing a target route of the third vehicle to the recommended route, and controlling the third vehicle to travel the specific section of the road along the recommended route; and when not receiving the recommended traveling information from the management and control system, controlling the third vehicle to continue performing the traveling control to follow the target route of the third vehicle, wherein the third vehicle control system is further configured to:

determine, based on receiving the recommended traveling information from the management and control system, whether an obstacle in the specific section prevents the third vehicle from maintaining the recommended route based on surrounding information of the third vehicle;

control the third vehicle to travel the specific section of the road along the recommended route further based on determining that no obstacle prevents the third vehicle from maintaining the recommended route; and control the third vehicle to travel the specific section of the road along a new traveling route calculated based on surrounding information using at least one of the camera device and the radar device of the third vehicle when determining that the obstacle prevents the third vehicle from maintaining the recommended route.

6. The traffic control system according to claim 1, wherein the traveling control is further configured to cause a speed deviation amount of the first vehicle from a target speed to converge within a speed control range,
the first vehicle is controlled, based on the surrounding information, to deviate from the target speed so that the speed deviation amount exceeds the speed control range of the traveling control in the specific section, and
the traveling information further includes a speed deviated from the target speed.

7. The traffic control system according to claim 5, wherein the traveling control is further configured to cause a speed deviation amount of the first vehicle from a target speed to converge within a speed control range,
the first vehicle is controlled, based on the surrounding information, to deviate from the target speed so that the speed deviation amount exceeds the speed control range of the traveling control in the specific section, and
the traveling information further includes a speed deviated from the target speed.

8. A traffic control system comprising:
a first vehicle control system, mounted on a first vehicle, configured to be communicably connected with a cloud computing system, wherein the first vehicle control system is configured to perform operations including:
determining a center position in a width direction of a traveling lane where the first vehicle travels using at least a sensor of the first vehicle;
performing traveling control to cause a deviation amount of the first vehicle in the width direction of the traveling lane from the center position to converge within a control range;
obtaining surrounding information of the first vehicle using at least one of a camera device and a radar device of the first vehicle, wherein the surrounding information includes a position in a lateral direction of the first vehicle with respect to the center position of the traveling lane; and
transmitting traveling information of the first vehicle and position information of a specific section of a road based on determining that the first vehicle travels the specific section, the specific section being each of sections where the first vehicle is controlled, based on the surrounding information, to deviate from the center position of the traveling lane when performing the traveling control so that the deviation amount exceeds the control range of the traveling control, the traveling information including information on the position in the lateral direction of the first vehicle in the specific section, information on a position of the specific section, and a passing time at which the vehicle passed the specific section, the traveling information not being transmitted when the first vehicle travels a traveling section other than the specific section,
wherein the cloud computing system is configured to perform operations including:
collecting the traveling information from the first vehicle control system and traveling information from a second vehicle control system configured to perform operations that are same as the operations to be performed by the first vehicle control system;
extracting information from the collected traveling information including the traveling information from the first vehicle control system and the traveling information from the second vehicle control system, by removing, in a case where a value corresponding to the position in the lateral direction of the first vehicle deviates from a predetermined value by a set value or more, the traveling information from the first vehicle control system from the collected traveling information;
based on the extracted information, generating recommended traveling information for the specific section, the recommended traveling information including a recommended route for vehicles to pass the specific section; and
transmitting the recommended traveling information, based on the position information of the specific section, to a third vehicle that is detected as a vehicle traveling the road toward the specific section,
wherein the traffic control system further comprises a third vehicle control system, mounted on the third vehicle, configured to perform operations including:
based on receiving the recommended traveling information from the cloud computing system, changing a target route of the third vehicle to the recommended route, and controlling the third vehicle to travel the specific section of the road along the recommended route; and
when not receiving the recommended traveling information from the cloud computing system, controlling the third vehicle to continue performing the traveling control to follow the target route of the third vehicle, and
wherein the third vehicle control system is further configured to:
determine, based on receiving the recommended traveling information from the cloud computing system, whether an obstacle in the specific section prevents the third vehicle from maintaining the recommended route based on surrounding information of the third vehicle;
control the third vehicle to travel the specific section of the road along the recommended route further based on determining that no obstacle prevents the third vehicle from maintaining the recommended route; and
control the third vehicle to travel the specific section of the road along a new traveling route calculated based on surrounding information using at least one of the camera device and the radar device of the third vehicle when determining that the obstacle prevents the third vehicle from maintaining the recommended route.

9. The traffic control system according to claim 1, wherein the management and control system is configured to perform the operations including:
collecting traveling information sets from vehicles configured to perform operations that are same as the operations to be performed by the first vehicle control system, each of the traveling information sets including information on a position in the lateral direction of each of the vehicles in the specific section, information on a position of the specific section, and a passing time at which each of the vehicles passed the specific section;

determining that the collected traveling information sets have been received by a predetermined number or the collected traveling information sets have been received for a predetermined period of time;

continuing, based on determining that the traveling information sets have not been collected by the predetermined number or the traveling information sets have not been collected for the predetermined period of time, the collecting traveling information sets; and starting, based on determining that the number of collected traveling data has reached the predetermined number or the traveling data has been collected for the predetermined period of time, extracting the information.

10. The traffic control system according to claim 5, wherein the management and control system is configured to perform the operations including:

collecting traveling information sets from vehicles configured to perform operations that are same as the operations to be performed by the first vehicle control system, each of the traveling information sets including information on a position in the lateral direction of each of the vehicles in the specific section, information on a position of the specific section, and a passing time at which each of the vehicles passed the specific section;

determining that the collected traveling information sets have been received by a predetermined number or the collected traveling information sets have been received for a predetermined period of time;

continuing, based on determining that the traveling information sets have not been collected by the predetermined number or the traveling information sets have not been collected for the predetermined period of time, the collecting traveling information sets; and starting, based on determining that the number of collected traveling data has reached the predetermined number or the traveling data has been collected for the predetermined period of time, extracting the information.

11. The traffic control system according to claim 8, wherein the cloud computing system is configured to perform the operations including:

collecting traveling information sets from vehicles configured to perform operations that are same as the operations to be performed by the first vehicle control system, each of the traveling information sets including information on a position in the lateral direction of each of the vehicles in the specific section, information on a position of the specific section, and a passing time at which each of the vehicles passed the specific section;

determining that the collected traveling information sets have been received by a predetermined number or the collected traveling information sets have been received for a predetermined period of time;

continuing, based on determining that the traveling information sets have not been collected by the predetermined number or the traveling information sets have not been collected for the predetermined period of time, the collecting traveling information sets; and starting, based on determining that the number of collected traveling data has reached the predetermined number or the traveling data has been collected for the predetermined period of time, extracting the information.

* * * * *